United States Patent [19]

Munro et al.

[11] Patent Number: 4,553,472
[45] Date of Patent: Nov. 19, 1985

[54] PISTONS AND METHOD FOR THEIR MANUFACTURE

[76] Inventors: Robert Munro, Avenue House, 9 Sutherland Rd., Lymington, Hampshire SO4 9GP; David A. Parker, Orchard Cottage, Broadwell, Rugby, Warwickshire CV23 8HB; Neil A. Graham, 162 Keresley Rd., Coventry, Warwickshire CV6 2JJ, all of England

[21] Appl. No.: 525,462

[22] Filed: Aug. 22, 1983

[30] Foreign Application Priority Data

Aug. 20, 1982 [GB] United Kingdom ................ 8224040

[51] Int. Cl.$^4$ .............................................. F04B 31/08
[52] U.S. Cl. ................................. 92/176; 29/156.5 R; 92/231
[58] Field of Search .......................... 92/176, 231, 260; 123/193 P; 29/156.5 R

[56] References Cited

U.S. PATENT DOCUMENTS

| 1,245,641 | 11/1917 | Verplanck | 92/176 |
| 1,719,215 | 7/1929 | Faroy et al. | 92/176 X |
| 1,723,187 | 8/1929 | Lemieux | 92/176 |
| 3,190,273 | 6/1965 | Bachle et al. | 92/231 X |
| 4,242,948 | 1/1981 | Stang et al. | 92/212 |
| 4,372,194 | 2/1983 | Vallaude | 92/176 |

FOREIGN PATENT DOCUMENTS

| 878885 | 6/1953 | Fed. Rep. of Germany | 92/176 |
| 964281 | 5/1957 | Fed. Rep. of Germany | 92/176 |
| 791324 | 9/1935 | France | 92/176 |
| 1118075 | 12/1925 | Switzerland . | |
| 539568 | 5/1940 | United Kingdom . | |
| 1830130 | 10/1958 | United Kingdom . | |
| 1051751 | 9/1963 | United Kingdom . | |
| 1114840 | 5/1967 | United Kingdom . | |
| 1537357 | 3/1975 | United Kingdom . | |
| 2058291 | 3/1979 | United Kingdom . | |

*Primary Examiner*—Edward K. Look
*Attorney, Agent, or Firm*—Leydig, Voit & Mayer, Ltd.

[57] ABSTRACT

A piston for an internal combustion engine is provided with a crown portion heat insulated from the remainder of the piston over all or substantially all of the area of the crown, to reduce the transfer of heat from the crown to the remainder of the piston. The insulation may be by a chamber extending across the piston and the chamber may contain a vacuum. Such a piston can be manufactured by a process involving roll-bonding aluminum or an aluminum alloy to a ferrous material in order to secure a crown of ferrous material to the remainder of the piston made from aluminum or aluminum alloy.

10 Claims, 9 Drawing Figures

PISTONS AND METHOD FOR THEIR MANUFACTURE

BACKGROUND OF THE INVENTION

1. Field of the Invention

The invention relates to pistons for internal combustion engines and to methods for their manufacture.

2. Review of the Prior Art

In the combustion chamber of an internal combustion engine whether located away from the piston or bounded by the piston, heat is generated on ignition of the fuel and the purpose of the engine is to convert this heat efficiently into usable engine power. Since the components surround the combustion chamber (the piston, the cylinder or cylinder liner, the piston head, and inlet and outlet valves) are made from heat conductive materials, some of the heat created on ignition will be lost by heat conduction through these parts. Any reduction of heat lost in this way may be used to improve the efficiency of the engine as well as increasing the temperature in the combustion chamber.

The components surrounding the combustion chamber must, however, be capable of resisting the temperatures achieved in the combustion chamber without long term damage being caused. Since pistons are customarily made from aluminium or aluminium alloy this can cause problems, if the combustion chamber temperature is raised, since these materials are not readily able to withstand high temperatures. In addition, since the heat is conducted axially down the piston, it is necessary to ensure that all the various parts of the piston, such as the piston rings, the piston ring grooves and the skirt are all suitably heat resistant and this can result in the need to use complex alloys which are expensive and, in the case of piston ring grooves, to reinforce them. In addition, where a number of piston rings are provided, the top piston ring closest the combustion chamber must be made of a material able to resist high temperatures and must be made with natural radial springiness to urge it against the cylinder or liner wall since the temperatures encountered do not permit the use of a separate ring expander.

SUMMARY OF THE INVENTION

According to a first aspect of the invention there is provided a piston for an internal combustion engine and comprising a crown portion which is heat insulated from the remainder of the piston over all or substantially all of the area of the crown, to reduce the transfer of heat from the crown to the remainder of the piston, the crown portion being made of a material more heat-resistant than the material of which at least part of the remainder of the piston is made.

According to a second aspect of the invention, there is provided a method of manufacturing a piston for an internal combustion engine and comprising forming the piston with a crown portion heat insulated from the remainder of the piston over all or substantially all of the area of the crown to reduce the transfer of heat from the crown to the remainder of the piston.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
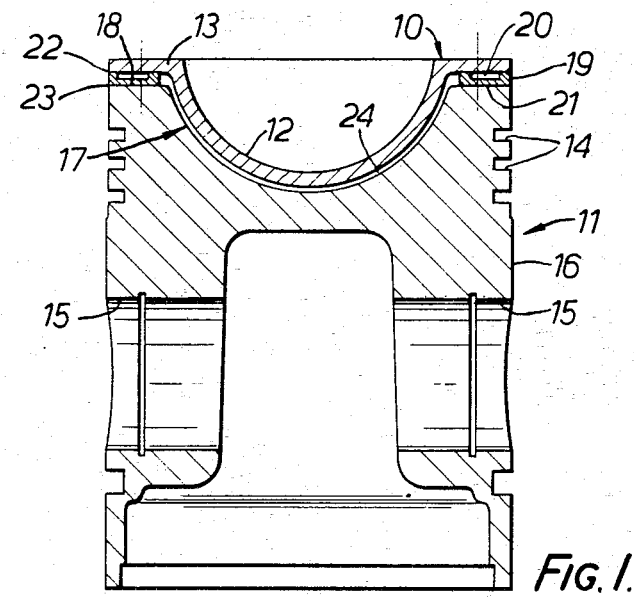
FIG. 1 is a cross-sectional view of a first form of piston having a crown spaced from the remainder of the piston by a sealed insulating chamber.

Referring first to FIG. 1, the piston comprises a crown 10 which is formed from a iron-based material such a nickel iron (e.g. iron 738) or mild steel or stainless steel. The crown is formed with a hemispherical combustion bowl 12 and an annular peripheral radially directed flange 13.

The remainder of the piston comprises a piston body 11 formed by casting from an aluminium or an aluminium alloy and having piston ring grooves 14, gudgeon pin bores 15 and a skirt 16. The piston body 11 terminates at its upper end in a hemispherical depression 17 and annular peripheral radially extending surface 18; this surface 18 and the hemispherical depression 17 being similarly dimensioned to the hemispherical combustion bowl 12 and the flange 13 of the crown 10.

An intermediate member is provided between the crown 10 and the piston body 11 and is formed as an annular washer 19 made of a ferrous material such as austenitic iron. The washer 19 has an annular channel 20 in the upper radially extending surface, intermediate its inner and outer edges, and facing the flange 13 of the crown 10. The lower radially extending surface 21 of the washer 20 is provided with a layer of an aluminium or aluminium alloy roll bonded to the surface. This roll bonding is achieved by placing a layer of aluminium or aluminium alloy on the surface and then applying pressure via a roller to the layer and the surface sufficient to increase the length of the layer and reduce its thickness and to form an intimate bond between the layer and the surface. The bond is sufficiently strong to resist all operating loads imposed on the washer 19 and is sufficiently complete to prevent leakage of gases between the component parts. The technique can be performed either hot or cold and is a technique used in bearing construction.

The crown 10 is joined to the washer 19, and the washer 19 is joined to the piston body 11 by a weld extending around the outer circumference of the piston at the joins 22, 23 between the respective parts. The weld may be performed by a laser beam welding technique or by an electron beam welding technique.

The presence of the roll bond between the aluminium or aluminium alloy material and the surface of the washer 19, prevents the formation of brittle aluminium compounds.

Alternatively, the connection may be by means of a number of angularly spaced screws passing through the crown and the washer 19 and engaging in the piston body 11. In this case, seals are provided between the parts to ensure that the chamber 24 is sealed; the roll bonding will, of course, be omitted.

When so joined, the crown 10 and the piston body 11 form between them a sealed heat insulating chamber 24 extending across substantially the whole cross-sectional area of the crown. The annular channel 20 in the washer 19 helps to reduce the transfer of heat from the crown 10 to the body 11 via the washer 19. In effect, this channel 20 forms a second insulating chamber concentric with the chamber 24.

In order to decrease the transfer of heat through the chamber, the pressure in the chamber may be reduced below atmospheric, for example, there may be a vacuum formed in the chamber. There will also be a corresponding decrease in pressure in the channel 20 provided in the washer 19. This can be achieved by forming the joints by electron beam welding because such welding is accomplished in a vacuum and thus a vacuum is created in the chamber 24 while the welds are being formed and remains in the chamber due to the sealing action of the welds and due to the completeness of the bond between the ferrous material and the aluminium or aluminium alloy of the washer 19.

Where there is reduced pressure in the chamber 24, this will tend to hold the crown 10 on the piston body 11 against the action of inertial forces at top dead centre. Alternative, the pressure may be arranged so that at working temperatures the pressure in the chamber 24 is atmospheric pressure or substantially atmospheric pressure to prevent there being any above-atmospheric pressure in the chamber 24 which would tend to push the crown 10 off the piston body 11.

When the piston is mounted in a high or medium speed diesel engine, particularly of the direct injection type, combustion takes place in the combustion bowl 12. The transfer of heat from the bowl 12 down through the piston body 11 is reduced considerably by the presence of the chamber 24.

In order to further reduce black body radiation in the chamber, the surfaces of the chamber may be polished or painted. Additionally, or alternatively, a radiation reducing material may be included in the chamber 24 in the form, for example, of a sandwich of layers of reflective material and mica or in the form of a three-dimensional reticulated matrix of reflective material.

Due to this reduction in heat transfer, the temperature of the crown is increased and the temperature of the piston body is reduced. For example, the crown may be at 700°–800° C. while the piston body is at 150°. This will also increase the cylinder head temperature and these increases in temperature suggest that, for a medium speed turbo charged engine, an improvement in work output of some 2.7% might be achieved in comparison with a similar engine not having pistons of the kind described above and using the same fuel input.

In addition to improved engine efficiency and reduced fuel consumption, there are a number of possible secondary benefits which may arise as a result of insulating the piston crown in the manner described with reference to the drawings. Possible benefits may include:

1. Easier starting and less cold smoke due to a faster temperature rise of the crown, 2. Lowered noise due to reduced ignition lag which allows more controlled combustion and lower piston temperatures which in turn permit lower cold clearances and hence improved guidance and reduced mechanical noise, 3. A reduction in the ring temperatures allowing a higher top ring position, resulting in reduced piston length and smaller top land dead volume, 4. Reduction of crown burning and cracking particularly at the bowl lip due to the possibility of utilising alternative materials to aluminium and aluminium alloys, 5. Reduction of piston body temperature levels and gradients resulting in lower stress levels and lower thermal expansion, 6. Since the piston body temperature is reduced, the piston sealing means, which are usually piston rings or control rings, can be made more sophisticated to ensure improved sealing and materials can be used which would not survive the high temperatures normally encountered in this part of the piston, 7. Because of improved sealing afforded by the wider choice of materials available, the number of rings may be reduced, reinforcement of the piston ring grooves may not be required and the rings can be moved nearer to the crown of the piston, making better use of the piston and possibly reducing its axial length for the same output, 8. The possibility of using unconventional materials for the piston body including the possibility of the use of plastics materials.

A piston similar to the piston described above with reference to FIG. 1 in a single cylinder forced asperation diesel engine gave the results indicated in Table 1.

TABLE 1

| ENGINE CONDITION PISTON | 2000 rev/min. | |
| --- | --- | --- |
| | STANDARD | INSULATED AT SAME BOOST |
| Boost Pressure, bar | 0.55 | 0.55 |
| Air flow gm/s | 15.54 | 15.69 (+1%) |
| Fuel flow, gm/s | 0.486 | 0.463 (−4.7%) |
| Air/Fuel Ratio | 32.0 | 33.9 (+1.9%) |
| Exhaust Temperature °C. | 354 | 379 (+25° C.) |
| Heat flow to exhaust, KW | 6.42 | 6.93 (+7.9%) |
| imep, bar | 8.15 | 8.80 (+8.0%) |

( ) - Figures given in brackets show change in measurement with respect to standard piston.

This shows that it is possible to reduce fuel consumption by up to about 5% and increase the rejection of heat to the exhaust by an amount which is the equivalent of 8% of brake output.

It will be appreciated that in the embodiment of FIG. 1, the roll-bond is important in ensuring that a positively sealed connection can be made between the ferrous material of the crown 10 and the aluminium or aluminium alloy of the piston body, because the roll-bonding ensures a complete bond between the aluminium or aluminium alloy of the washer 19 and the ferrous material of the washer 19. Because of the favourable characteristics of this bond, it would be possible to form the crown 10 from a disc of ferrous material roll-bonded to aluminium or aluminium alloy, with a central area of the aluminium or aluminium alloy being removed to leave only a peripheral annulus of this material. The combustion bowl 12 is formed in the central area. The peripheral annulus is joined directly to the piston body 11 to secure the crown to the piston body 11, the washer 19 thus being omitted. The annulus of aluminium or aluminium alloy can be made of any required thickness and may have a channel formed therein similar to the channel 20 in the washer 19, but facing the piston body 11.

Figure 2:
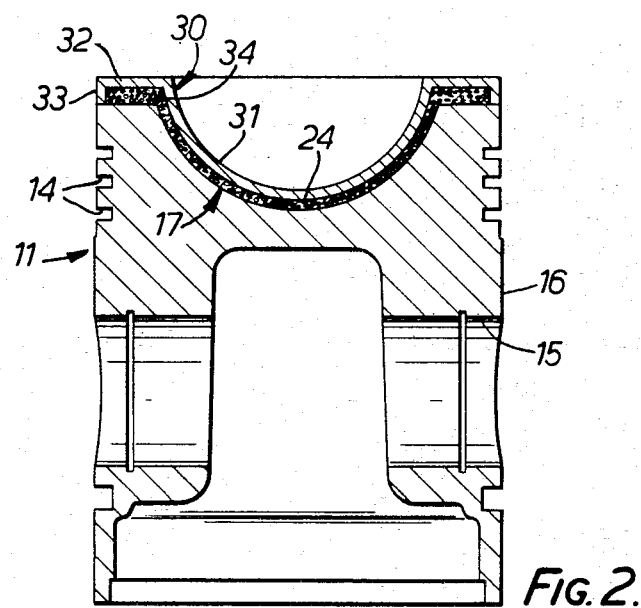
FIG. 2 is a cross-section through another form of piston having the crown spaced from the remainder of the piston by a sealed insulating chamber.

Referring next to FIG. 2, parts common to FIG. 1 and FIG. 2 will be given the same reference numerals and will not be described in detail. In FIG. 2, the crown 30 is formed from a nickel chromium material with a combustion bowl 31, a radially extending flange 32 and an axially extending depending flange 33. The space beneath the crown 30 is formed with a matrix material 34 having reflective properties and low heat conduction in an axial direction. The crown 30 and the material 34 are adhered to the end surface 17 of the piston body 11 with a seal being formed between the free end of the depending flange 33 and the upper surface 17 of the piston body 11, to form the closed chamber 24.

As before, the pressure in this chamber may be reduced below atmospheric to have, for example, a vacuum in the chamber 24.

In use, the piston of FIG. 2 operates in the same way as the piston of FIG. 1 with the same advantages and benefits. The matrix material 34 provides support for the crown 30 as well as preventing the passage of radiant heat through the chamber 24 and restricting the flow of convected heat through the chamber.

Figure 3:
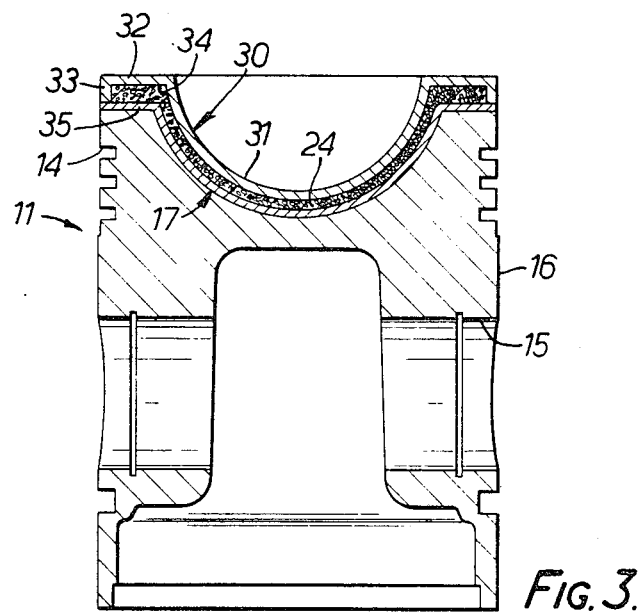
FIG. 3 is a view of a similar piston to the piston of FIG. 2 but having the remainder of the piston covered by a metallic layer.

Referring next to FIG. 3, parts common to FIGS. 1 and 2 and to FIG. 3 will not be described in detail and will be given the same reference numerals. In FIG. 3, the upper surface 17 of the piston body 11 is clad in an aluminium silicon alloy using a roll bonding technique of the kind described above with reference to FIG. 1. The depending flange 33 is then attached to the layer 35 to form the chamber 24 which, as before, may be evacuated.

Figure 4:
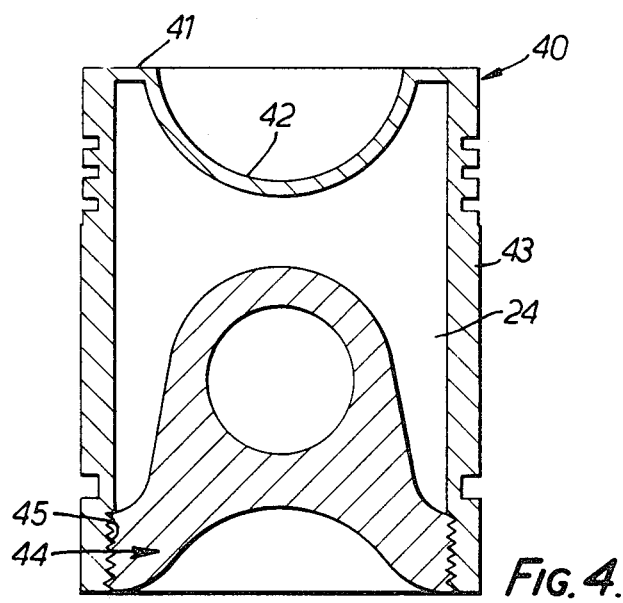
FIG. 4 is a cross-sectional view of a piston having a sealed insulating chamber between the crown and the remainder of the piston, with the crown being in screw-threaded engagement with the remainder of the piston.

Referring next to FIG. 4, the piston shown in this Figure is formed by a crown 40 of a resistant material having an upper surface 41 including a combustion bowl 42 and a depending skirt portion 43 which forms the skirt of the piston. The remainder of the piston 44, which is formed from aluminium or an aluminium alloy, has an annular outer surface formed with screw thread which is in engagement with a corresponding screw thread 45 provided at the lower end of the skirt portion 43 of the crown 40. A chamber 24 is thus formed between the body portion 44 and the crown 40. This chamber may be evacuated and/or may contain a reflective material of low heat conductivity as described above.

Figure 5:
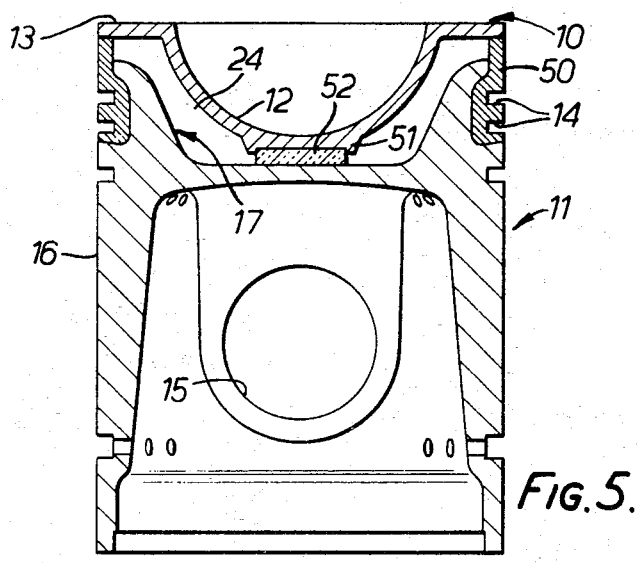
FIG. 5 is a cross-sectional view of a piston having the crown spaced from the remainder of the piston by a sealed insulating chamber.

Referring next to FIG. 5, parts common to FIGS. 1 and 5 will be given the same reference numerals and will not be described in detail. In FIG. 5, the intermediate member is in the form of a hollow cylinder 50 formed from an iron based material. The lower part of the cylinder is formed with the piston ring grooves 14 and the upper end terminates in a flat annular surface.

The piston is manufactured by inserting the member 50 into a mould and then casting the piston body 11 around the member so that the member and the piston body are securely locked together. The crown 10 is then joined to the upper surface of the member 50 which, since it extends beyond the upper end of the piston body 11, forms a chamber 24 between the crown 10 and the body 11. The join may be formed by use of an electron beam or a laser beam, as described above. In addition, as also described above, the chamber 24 may be evacuated.

The undersurface of the crown 10, in the piston of FIG. 5, is formed with a circular bead 51 which receives a cylindrical block 52 of silicon nitride or any other suitable load bearing insulating material interposed between the crown 10 and the piston body 11. This serves to support the crown 10 at elevated piston temperatures so that axial loads are transmitted from the crown 10 to the piston body 11. The silicon nitride, being a poor conductor of heat, does not have an adverse effect on the transfer heat from the crown 10 the piston body 11.

Figure 6A:
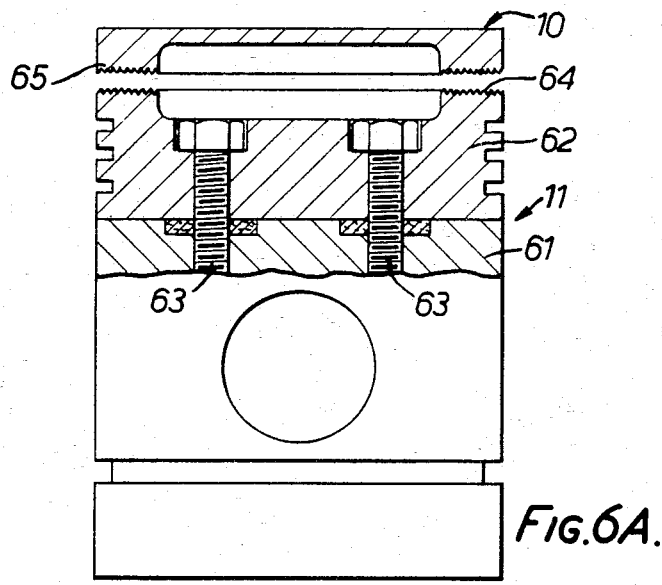
FIGS. 6A and 6B are schematic views of successive steps in the friction welding of a crown of a piston to the remainder of the piston to form a sealed insulating chamber therebetween.
Figure 6B:
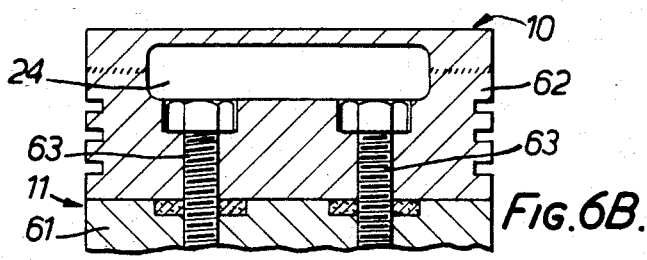

Referring next to FIGS. 6A and 6B, these Figures show diagrammatically an alternative way in which the chamber 24 can be formed. In this case, the piston body 11 is formed in two parts; a lower part 61 formed of aluminium or an aluminium alloy and an upper part 62 formed from an iron based material. The upper part 62 is generally cylindrical in shape and is attached to the lower part 61 by four studs 63 extending through the upper part 62 and screwed into the lower part 61 with a fibre washer between the two parts.

The upper surface of the upper part is provided with a peripheral annular region 64 which is roughened.

The crown 10 may be formed with a combustion bowl (not shown). The under surface of the crown 10 is formed with a peripheral annular depending portion 65 which has a roughened lower surface.

The crown 10 is, as shown in FIG. 6B, forced down on to the upper portion 62 of the piston body 11 and the two parts are relatively rotated. Heat is generated between the roughened surfaces 64, 65 and this forms a friction weld between the crown 10 and the body 11. Since the surface 65 is formed on a projection, a sealed chamber 24 is formed between the crown and the piston body 11. This chamber will have the advantages described above in relation to FIG. 1. If the friction weld is formed in a vacuum, then the chamber 24 will be evacuated.

Referring next to FIG. 7, once again parts common to FIGS. 1 and 7 will be given the same reference numerals and will not be described in detail. The piston of FIG. 7 has the crown 10 formed from silicon nitride and has an outer cylindrical surface 70 whose diameter is less than the diameter of the piston body 11. An annular rabbet 71 is formed around the upper end of the crown 10.

A composite intermediate member 72 is formed by an upper hollow annular part 73 formed, for example, from invar (or any other suitable material having a coefficient of thermal expansion near or slightly less than that of the crown material) and connected to and coaxial with a lower hollow annular part 74 formed from 45% nickel iron. The two may be connected by a weld. The lower part 74 has a screw thread which is in engagement with a corresponding thread 75 provided around the top of the piston body 11. The inner surface of the composite member 72 has a diameter greater than the outer diameter of the crown 10 so that there is an annular gap 76 between the two parts.

A number of steel discs 77 with a high surface roughness are provided between the under surface of the crown and the upper surface of the piston body 11. The crown 10 is forced down on to these discs as the member 72 is threaded onto the piston body 11 by engagement of a flange of the upper part 73 in the rabbet 71 provided around the crown 10. The annular gap 76 is filled with ceramic fibre insulation.

Both the steel discs 77 and the ceramic fibre insulation may be replaced by a three-dimensional matrix material having low thermal conductivity and high reflectivity.

Figure 8:
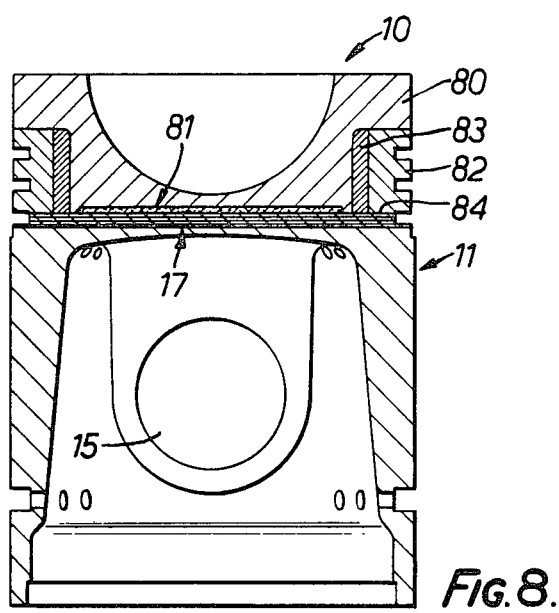
FIG. 8 is a similar view to FIG. 7 but with an alternative arrangement of the crown and of the insulation between the crown and the remainder of the piston.

Referring finally to FIG. 8, parts common to FIGS. 1 and 8 will be given the same reference numerals and will not be described in detail. The piston of FIG. 8 has a crown 10 of silicon nitride formed with an outwardly directed flange 80 whose outer diameter is equal to the outer diameter of the body portion 11. The under surface of the crown 10 is formed with a circular depression 81.

An intermediate member 82 of ferritic iron is bonded to the upper surface of the flange 80 and has an internal diameter which is greater than the external diameter of the depending part of the crown 10 so that an annular gap 83 is formed between these parts. The member 82 is also joined to the crown 10 by a graduated braze extending through the gap 83 and formed by successive concentric layers of adjacently interconnected materials which are for example, starting from the crown, $Si_3N_4$, Alumina, $Ni_3Al$ and a braze. This allows a ceramic material to be joined to a metallic material by the use of a succession of materials which can be joined to one another and which have compatable properties.

The cavity 81 in the crown 10 contains ceramic fibre insulation or a matrix material of low thermal conductivity and high reflectivity.

A graded defused ferrous laminate 84 is arranged between the upper surface 17 of the piston body and the under surfaces of the crown 10 and the member 82. The lower most surface of the layer 84 has an aluminium alloy material roll bonded onto its surface thus allowing the laminate 84 to be joined by a welding technique to the upper surface 17 of the piston body 11.

Since the member 82 is of ferritic iron, it can be joined directly to the graded diffused ferrous laminate 84.

Figure 7:
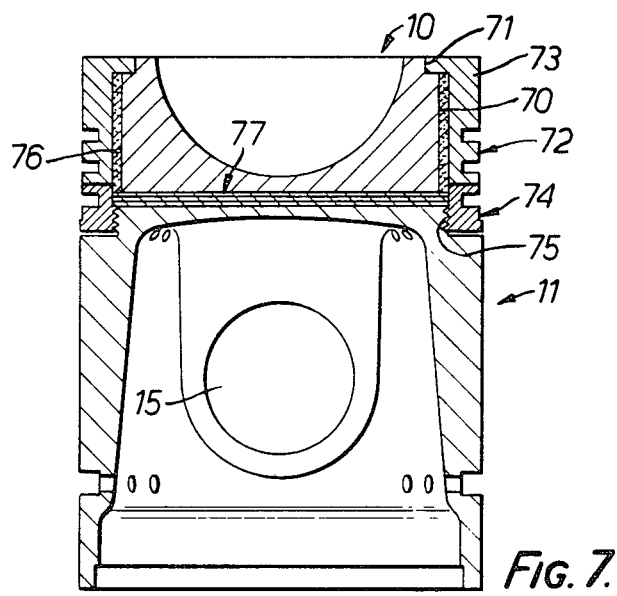
FIG. 7 is a cross-sectional view a piston having a crown insulated from the remainder of the piston by insulating material.

In the embodiments of FIGS. 7 and 8, the insulating effect is provided by the insulating materials arranged between the crown 10 and the body 11. It is believed, however, that this arrangement has similar advantages and affords similar possibilities for varying the construction of the remainder of the piston as do the embodiments of FIGS. 1 to 6.

The piston may be provided with a central movable piston-like member for varying the volume of the combustion chamber as the piston approaches top dead centre, in order to prevent excess pressure in the combustion chamber. In this case, it is within the scope of the invention to have the movable piston-like member insulated in any of the ways described above with reference to the drawings.

We claim:

1. A piston for an internal combustion engine comprising:
    a crown of an iron based material,
    a piston body of aluminium or an aluminium alloy,
    an annular intermediate member of an iron based material and arranged between the crown and the piston body to space the crown from the piston body and define a heat insulating chamber therebetween,
    a layer of an aluminium alloy roll bonded to a surface of the intermediate member which is adjacent the piston body,
    a weld joining the roll bonded layer to the piston body,
    a weld joining the intermediate member to the crown, said welds extending around the whole circumference of the piston to seal the chamber.

2. A piston according to claim 1 wherein the insulating chamber is divided by the intermediate member into at least two concentric, radially spaced, portions.

3. A piston according to claim 1 wherein the pressure in said insulating chamber is below atmospheric pressure.

4. A piston according to claim 3 wherein there is a vacuum in said chamber.

5. A piston according to claim 4 wherein the interior of the chamber is provided with means for reducing black body radiation in the chamber.

6. A piston according to claim 1 wherein the annular intermediate member is a washer-like member disposed between spaced radially extending peripheral surfaces of the crown and the remainder of the piston and is provided with an annular depression on a radially extending surface thereof, intermediate the inner and outer edges of the surface, for preventing the transfer of heat through the washer-like member to the remainder of the piston.

7. A method of manufacturing a piston for an internal combustion engine in which a crown of the piston is of an iron based material and the remainder of the piston is of aluminium or aluminium alloy, the method comprising:
    forming an annular intermediate member of an iron based material,
    roll bonding a layer of an aluminium alloy to that surface of the intermediate member which is to be joined to the remainder of the piston, and then
    welding the crown to the intermediate member and
    welding the intermediate member to the remainder of the piston to space the crown portion from the remainder of the piston and form a heat insulating chamber therebetween, the welds extending around the whole circumference of the piston to seal the chamber 8. A method according to claim 7 wherein the method includes forming the welds by the use of a laser beam or an electron beam.

9. A method according to claim 7 and comprising providing a total or partial vacuum in the chamber.

10. A piston for an internal combustion engine comprising:
    a piston body,
    an annular radially extending outer peripheral surface provided on the piston body,
    a crown portion of a material more heat resistant than the material of which at least a part of the piston body is made,
    an annular radially extending outer peipheral surface provided on the crown portion and facing the piston body peripheral surface,
    an intermediate washer-like member disposed between and connected to the peripheral surfaces of the piston body and the crown portion to provide the sole interconnection between the piston body and the crown protion and to form a heat insulting chamber therebetween inwardly of the washer-like member, and an annular depression provided around the washer-like member for reducing the transfer of heat from the crown portion to the piston body.

* * * * *